UNITED STATES PATENT OFFICE.

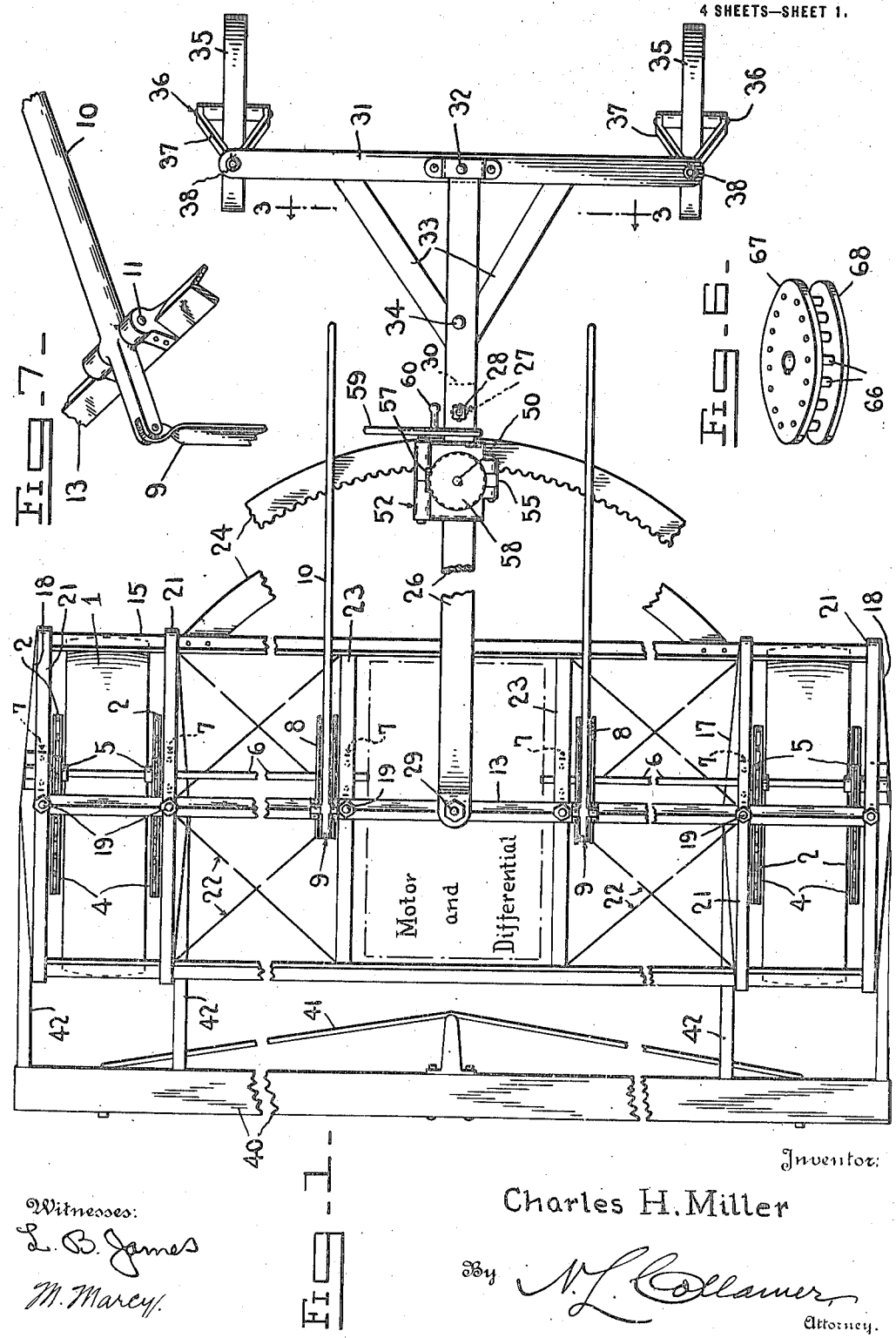

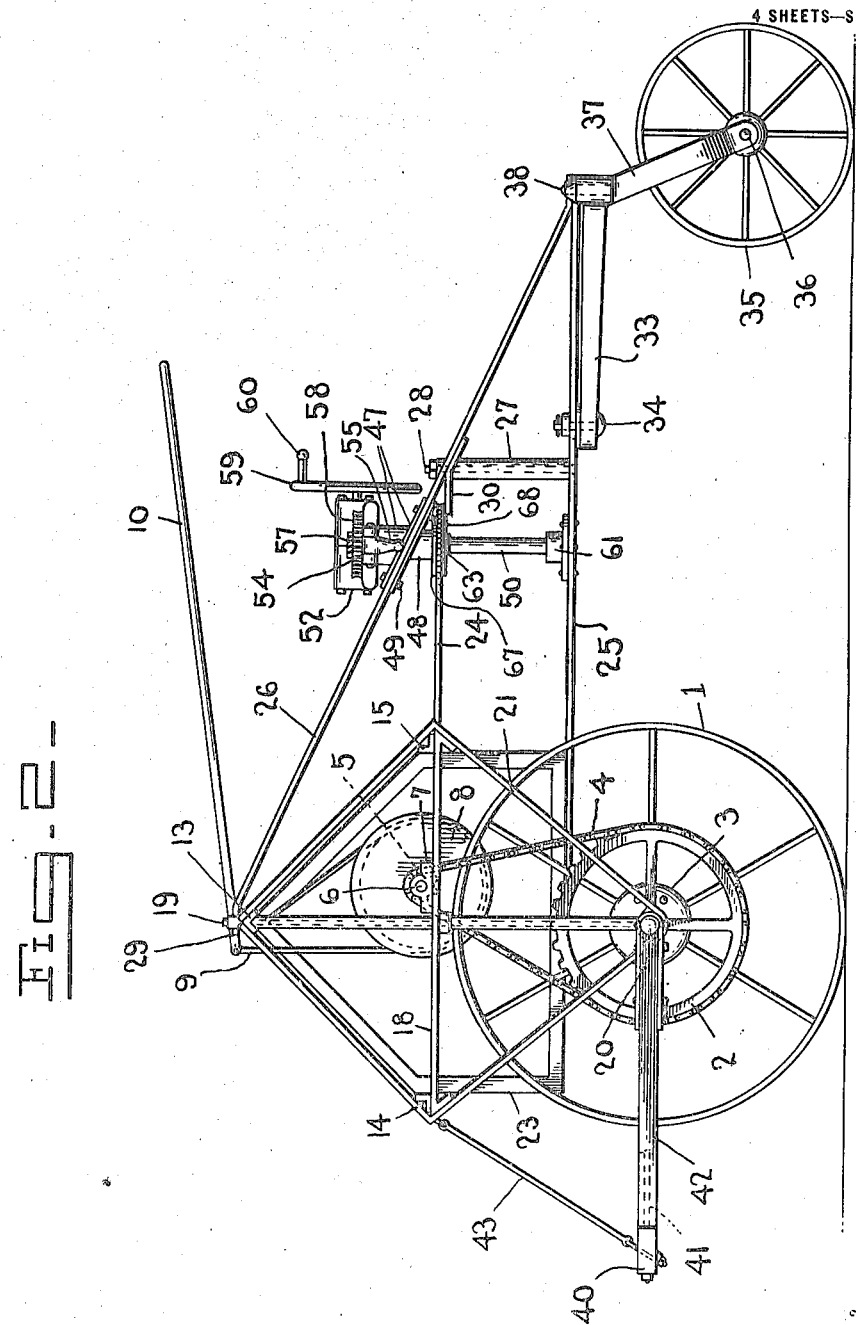

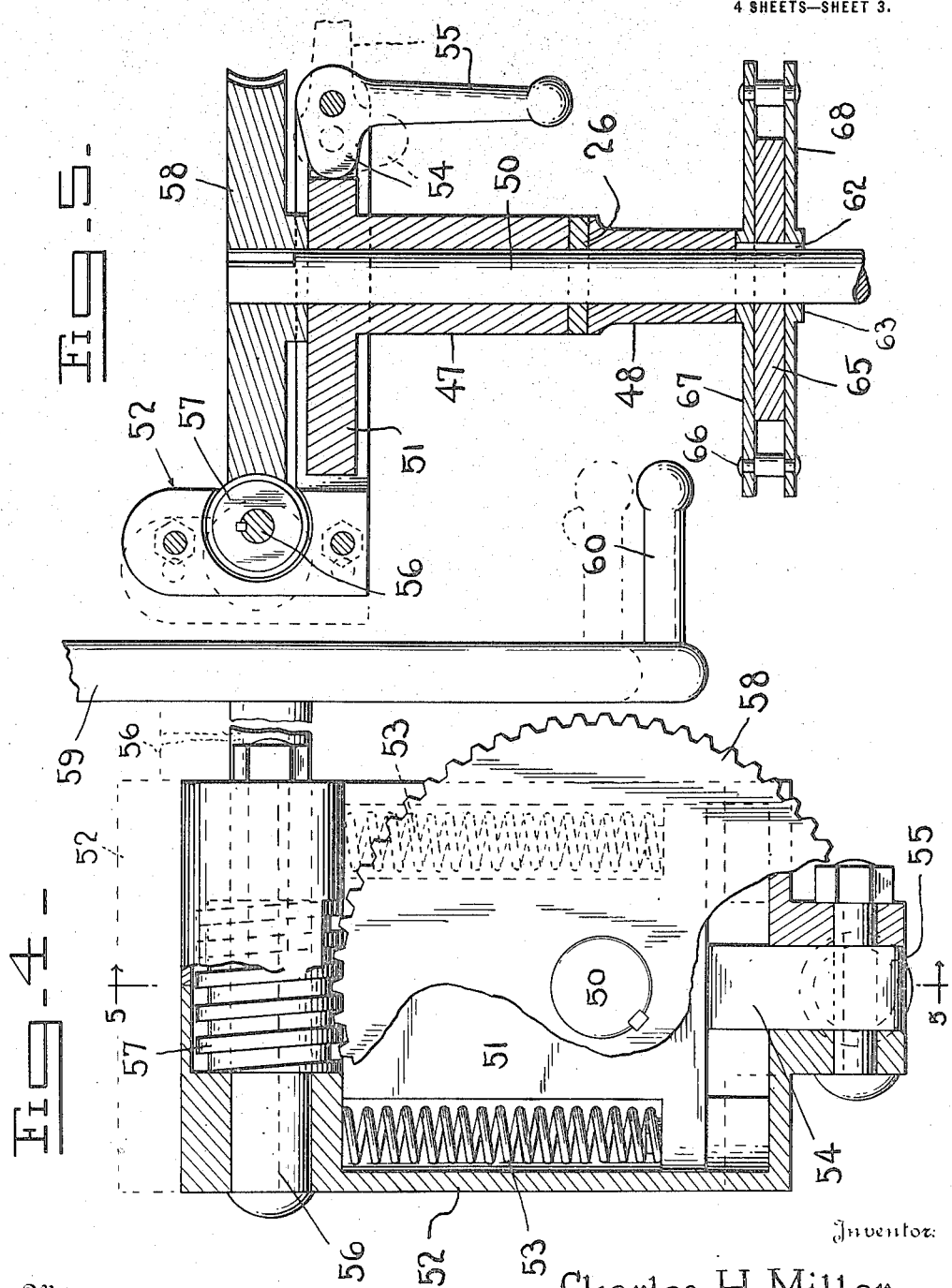

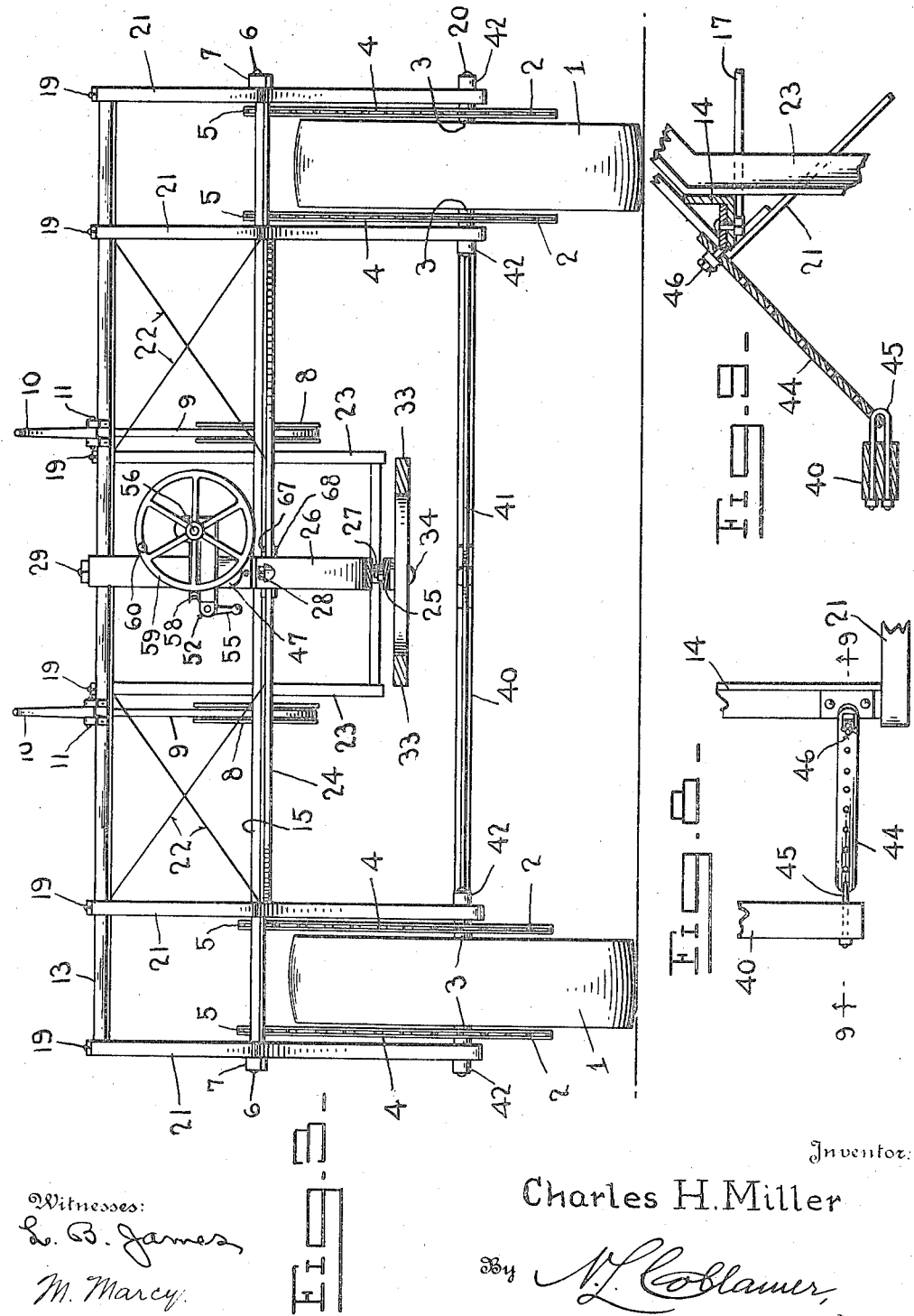

CHARLES H. MILLER, OF LIBERTYVILLE, IOWA.

FARM-TRACTOR.

1,248,693.      Specification of Letters Patent.      Patented Dec. 4, 1917.

Application filed February 12, 1916. Serial No. 77,862.

*To all whom it may concern:*

Be it known that I, CHARLES H. MILLER, a citizen of the United States, and a resident of Libertyville, Jefferson county, State of Iowa, have invented certain new and useful Improvements in Farm-Tractors; and my preferred manner of carrying out the invention is set forth in the following full, clear, and exact description, terminating with claims particularly specifying the novelty.

This invention relates to motor vehicles, and the object of the same is to produce a machine of this class adapted more especially for use on the farm as a two wheeled tractor for propelling farm machines. A truck is provided whereby the tractor becomes a four wheeled vehicle when it is to be moved from point to point without a farm machine attached, but when at work the tractor relies on the farm machine to keep it on its own supporting wheels, as will be explained. The tractor is extremely light, though powerful; and the invention may be said to consist in the details of construction whereby it is adapted to the purposes for which it is to be used. Particularly the invention lies in the means for steering the tractor and the attached machine, and for turning around at the end of each row. Reference is had to the drawings, wherein—

Figure 1 is a plan view and Fig. 2 a side elevation, both with the truck attached; Fig. 3 is a rear elevation without the truck, being a section on the line 3—3 of Fig. 1. Fig. 4 is an enlarged plan view of the steering mechanism, partly broken away; and Fig. 5 is a vertical section thereof on the line 5—5 of Fig. 4. Fig. 6 is a perspective detail of the so-called pin-wheel. Fig. 7 is a perspective detail of one of the brake levers. Fig. 8 is a plan view of a modified form of draft beam; and Fig. 9 is a sectional detail showing the adjustable support for the same.

The running gear of this improved tractor includes two like traction wheels 1 having large sprocket wheels 2 carried by their hubs 3, which wheels are connected by chain belts 4 with small sprocket wheels 5 fast on the drive shafts 6, and each shaft is journaled in three bearings 7. The inner ends of said shafts are connected by differential mechanism with a motor carried in a cage upon the main frame, and the words "Motor and differential" on the drawings will be sufficient indication of the location of these elements whose construction is immaterial to the present invention. Fast on each shaft 6 is a brake wheel 8 around which passes a brake band 9, one end of the same being fixed and the other end attached to a brake lever 10 pivoted at 11 on the frame. The levers extend to the rear to within reach of the operator, and when either is manipulated to apply its brake it will be clear that the rotation of the shaft and driving wheel on that side of the machine is retarded (as the differential permits) and the other side of the machine progresses more rapidly: hence the tractor may be guided or steered in this manner.

The frame is made up of an upper transverse bar 13 of inverted V-shape in cross section, front and rear frame bars 14 and 15 of L-shape cross section, trusses 17 and 18 connecting the front and rear bars as shown and supporting said bearings 7, and tie rods or wires 22 for preventing distortion of the skeleton thus built up. The outer ends of the three bars 13, 14, and 15 are inclosed by diamond-shaped hangers 21, one each side of each wheel; and long upright bolts 19 connect the upper bar 13 with the lower angles of the hangers, the latter being connected in pairs by short axles 20 to receive the hubs 3 of the driving wheels 1 and the bolts 19 passing through the axles to hold them firmly in place. The hubs contain antifriction bearings not necessary to show.

Between the innermost trusses the frame carries a pair of hangers in the shape of a cage 23 which supports the motor and differential where indicated, and the controls for the motor will be within reach of the operator. A draft bar or tongue 25 extends to the rear from a pivot beneath the center of the cage and in a plane slightly above that of the axles 20, and a main brace 26 leads from a pivotal point 29 at the center of the upper frame bar 13, obliquely downward and rearward to the rear end of the tongue. A strengthening bolt 28 is interposed between these members, surrounded by a spacing sleeve 27 carrying a guide 30; and in the latter moves a curved rack or toothed sector 24 whose ends are attached to the rear frame bar 15. It follows that when this sector is moved through the guide the entire frame will change its angle to the tongue, and therefore the tractor can be guided or steered in that manner.

A truck is provided for supporting the rear end of the tongue 25 when the tractor is not hitched to a machine. This truck (shown in Figs. 1 and 2) comprises an axle 31 connected with the rear extremity of the tongue by a pin or bolt 32, and possibly braced by hounds 33 also bolted to the tongue as at 34, and under each end of the axle a caster wheel 35 journaled at 36 in a fork 37 whose shank is pivoted at 38 in the axle. When this truck is attached, the tractor may move in either direction as of course the caster wheels will permit. I might here state that when the truck is detached the tongue may be hitched to rather high agricultural machines for drawing or pushing them, and such machines will of course take the place of the truck in supporting the tractor. The center of gravity of the latter will be a little to the rear of the center of the frame—perhaps about in line with the rear sides of the driving wheels 1 as seen in Fig. 2.

For handling heavier machines and perhaps where the point of attachment to them is lower, a draft beam 40 extends across the other end of the tractor, suitably braced as at 41, and connected by four couplings 42 with the wheel axles 20; and this beam may be held in a plane with said axles by means of one or more links 43 as shown in Fig. 2. Or an adjustable support may be employed, as shown in Figs. 8 and 9. This comprises a perforated strap 44 one end of which is connected by a U-bolt 45 with the beam, and a hook or bolt 46 carried by the frame and with which any of the perforations may be engaged. By this means the beam 40 may be adjusted in height to adapt it to the machine to which it is to be hitched, or it may be raised well out of the way of standing grain—especially when the tongue 25 is being used. Obviously the tractor may be driven in either direction.

The steering mechanism is carried by a casting made up of two parts 47 and 48 bolted as at 49 to the top and bottom of the brace 26 just forward of the guide 30, and through these parts and the brace is journaled the upright shaft 50. The upper part 50 has a head 51 on which is slidably mounted a frame 52 moved normally in one direction thereon by springs 53 as seen in Fig. 4, and a cam 54 and handle 55 is employed to move it in the other direction when desired. The frame 52 has bearings in which is mounted a shaft 56, carrying a worm 57 and a hand wheel or crank 59 with a handle 60; and the upper end of the shaft 50 carries a worm gear 58 with which the worm is adapted to be engaged by movement of the cam as seen in full lines in Fig. 5. When the cam is moved to the position which it occupies in dotted lines, the expansion of the springs disengages the worm and worm gear and the hand wheel 59 may be turned without turning the shaft 50. The latter is mounted at its lower end in a step bearing 61 on the tongue 25. Just below the part 48 the shaft 50 carries a gear, preferably in the nature of a pin-wheel; and the same is herein shown as made up of two disks or heads 67 and 68 having hubs 63 keyed at 62 on the shaft, the heads being spaced by a washer 65 thicker than the toothed sector, outside of which washer they are connected by pins 66 constituting teeth which engages said sector. Therefore rotation of the shaft—through the worm mechanism—rotates the pin wheel, and the latter moves the sector so that the angle of the tongue to the main frame may be changed manually; but the presence of the worm mechanism prevents an automatic return of parts to their original position as long as the cam is not set to disengage the worm and its gear. If so set this steering mechanism is thrown out of operation and the tongue and the machine attached to it (or the truck) trails behind the motor wheels, while the tractor is then steered with the brake levers as explained above. But the steering mechanism just described is useful for turning sharp corners, and especially for cutting forward and back—whether an agricultural machine is hitched to the tractor or not. If not (as already explained) the truck will be substituted so as to maintain equilibrium, and indeed it is possible to use the truck along with the machine being drawn by the tractor. It will not be necessary to illustrate the hitch by means of which such a machine is attached to the tractor, as the same forms no part of the present invention; but it will be clear that, when using the beam 40 especially, the machine could be hitched to such beam off the center of the same, and in fact a plurality of machines could be hitched to it side by side or tandem. With a right-hand mower or a left-hand binder, such as are used in my locality, the tongue will be shifted to one side out of the way, the truck being of course detached, and the machine attached or hitched to or near the proper end of the beam 40 to cause it to do its work while both wheels travel clear of the standing crop.

What I claim is:

1. A tractor comprising a frame, separately driven main wheels thereunder, means for retarding the rotation of either wheel, a tongue pivoted to the mid-length of the frame and standing normally at right angles thereto, a steering mechanism for swinging the tongue on its pivot, and a caster wheel for supporting the outer end of the tongue.

2. In a tractor, the combination with the frame, two separately driven main wheels thereunder, and a pivoted tongue having a third wheel; of independent brakes for the main wheels and by whose separate application the tractor may be steered, and an additional steering mechanism for adjusting the angle of the tongue to the frame.

3. In a tractor, the combination with the frame, separately driven main wheels thereunder, a toothed sector carried by the frame, and a tongue pivoted to the frame and extending across said sector; of brakes for independent application to the wheels, a shaft journaled in said tongue and carrying a pin wheel engaging said sector, and manually operated worm mechanism for turning said shaft.

4. In a tractor, the combination with the frame and main wheels, a tongue and brace pivoted at their inner ends to the frame and converging to and connected at their outer ends, a guide on the brace, and a toothed sector fast on the frame and moving through said guide; of an upright shaft journaled in the tongue and guide, a pin wheel thereon engaging said sector, a worm wheel fast on said shaft, a worm mounted in movable bearings and adapted to engage said worm wheel, manual means for rotating said worm, and means for moving its bearings, for the purpose set forth.

5. A two wheeled tractor comprising a transverse and relatively high frame, two hangers depending from each end thereof and carrying short axles, a wheel mounted on each axle, a cage for the motor at the mid-length of the frame, drive-shafts extending thence outward toward the ends of the frame and respectively connected with said wheels, and means for maintaining the equilibrium of the machine.

6. In a tractor, the combination with a transverse frame, hangers at the ends thereof, and power driven wheels in said hangers; of a draft beam parallel with said frame and extending past the wheels, couplings connecting it with the axles of said wheels, means for supporting it, a tongue pivoted to the frame and extending away from said beam, means for supporting its outer end, and means for adjusting its angle to the frame.

7. A frame for two-wheeled tractors comprising upper, front, and rear parallel bars transverse to the line of travel, trusses and ties connecting the front and rear bars, a pair of diamond-shaped hangers inclosing each end of said bars, axles connecting the lower angles of the hangers of each pair, bolts through their upper angles and said axles, a cage carried by the centers of said bars, and the draft mechanism.

8. In a tractor, the combination with a frame transverse to the line of travel, hangers depending from its ends in pairs and carrying short axles, large driving wheels mounted thereon, a motor on the frame, and connections between it and said wheels; of a draft beam parallel with said frame, couplings pivotally connecting it with said axles, perforated straps connected with said beam and leading upward, and elements on the frame engaging said perforations selectively for adjusting the height of the beam.

In testimony whereof I have hereunto subscribed my signature this the ninth day of February, A. D. 1916.

CHARLES H. MILLER.